T. J. ELLISON.
ANIMAL TRAP.
APPLICATION FILED NOV. 27, 1914.

1,149,190. Patented Aug. 10, 1915.

Witnesses
Einar Larson
E. F. Camp

Inventor
Thomas J. Ellison
By
Attorneys

UNITED STATES PATENT OFFICE.

THOMAS J. ELLISON, OF TERRILL, KENTUCKY.

ANIMAL-TRAP.

1,149,190.　　Specification of Letters Patent.　　Patented Aug. 10, 1915.

Application filed November 27, 1914. Serial No. 874,211.

*To all whom it may concern:*

Be it known that I, THOMAS J. ELLISON, a citizen of the United States, residing at Terrill, in the county of Madison and State of Kentucky, have invented certain new and useful Improvements in Animal-Traps, of which the following is a specification.

This invention relates to animal traps having spring jaws by which the animal is caught and held, and its object is to provide a novel and improved arrangement of jaws whereby the animal is effectually prevented from getting loose from the jaws, the latter being also constructed and arranged so that the animal's fur is not damaged thereby.

A further object of the invention is to provide a novel and improved trigger structure for holding the trap set.

Other objects and advantages of the invention will be pointed out in the detailed description appearing hereinafter.

In order that the invention may be better understood, reference is had to the accompanying drawing in which—

Figure 1:
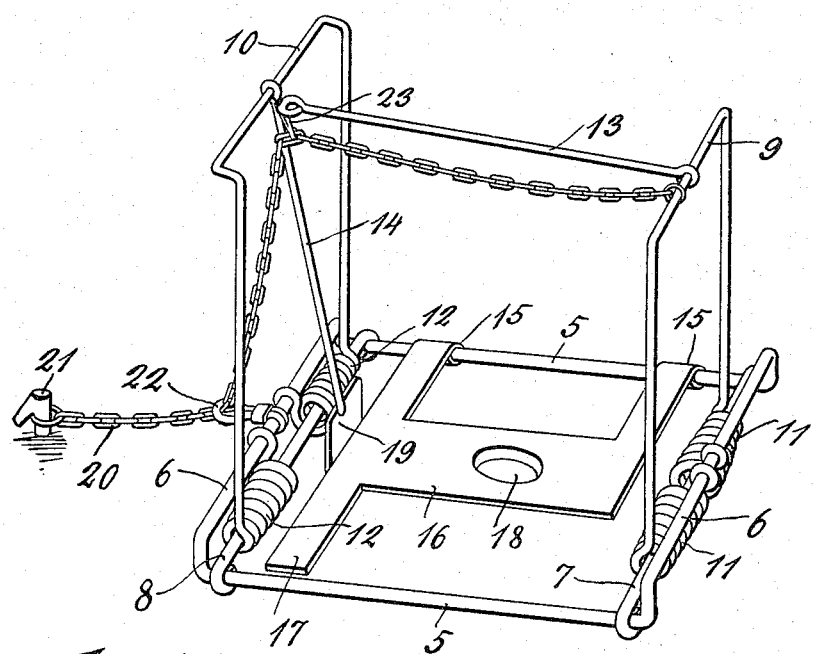
Figure 2:
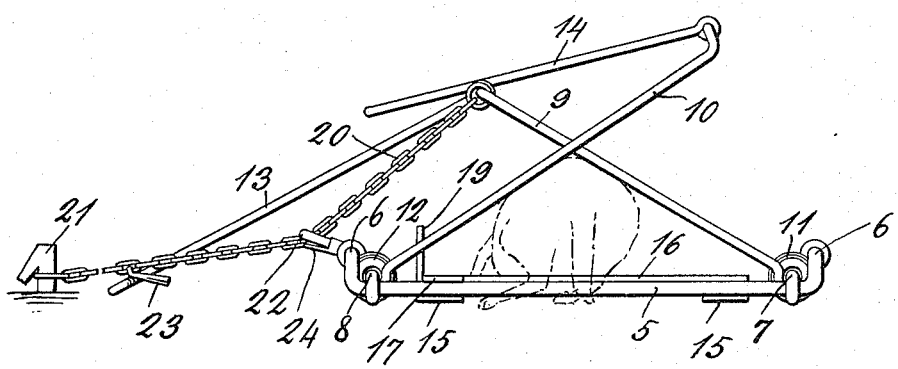

Figure 1 is a perspective view of the trap set, and Fig. 2 is a side elevation showing the trap sprung.

Referring specifically to the drawing, the base of the trap is a piece of wire bent into rectangular shape to form side bars 5 and end bars 6, the former having upward bends at their ends so that the latter are spaced from the ground. Adjacent to the ends of the side bars the same are connected by cross bars 7 and 8, respectively, which are also formed of wire and serve as supports for the jaws 9 and 10 of the trap.

Each jaw is formed of a single piece of wire which is bent to form two spaced, parallel side bars and a connecting cross bar at one end thereof. The other ends of the side bars are bent into coils and the terminals are connected to the end bars 6 of the base by being wrapped around the same. The cross bars 7 and 8 pass through the coils of the respective jaws. The spread and length of the side bars of the jaw 9 is less than that of the jaw 10, so that the jaw 9 may swing down between the side bars of the jaw 10.

The coils of the jaw 9 are indicated at 11, and those of the jaw 10 at 12, the cross bar 7 passing through the coils 11 and the cross bar 8 through the coils 12. The jaws, when set, are in perpendicular position and opposite each other, as shown in Fig. 1, and when released they swing downward, the coils 11 and 12 being the closing springs. The cross bar of the jaw 10 is offset rearward so that when the trap is not in use said jaw folds down over the jaw 9, and the two jaws lie close to the base. The trap may thus be folded flat and conveniently carried. The cross bar of the jaw 9 carries a trigger 13 and the cross bar of the jaw 10 carries a trigger 14. These triggers are wire rods which are pivoted to the cross bars of the respective jaws.

To one of the side bars 5 of the trap base is pivoted, as indicated at 15, a tilting bait-supporting platform 16 having at its free end a projecting finger 17 which extends across the other side bar 5 and is in the path of one of the side bars of the jaw 9, whereby said jaw is prevented from swinging lower than the base of the trap. The platform has a hole 18 at the center to hold the bait, and its side edge which is next to the jaw 10 has an upstanding bend 19 forming an abutment to be engaged by the trigger 14. The platform is between the jaws when the trap is set so that the animal must get between the latter to reach the bait.

The trap is set as follows: The jaws 9 and 10 being swung upward into perpendicular position, the platform 16 is tilted upward and the trigger 14 is dropped to depend from the cross bar of the jaw 10, its free end being placed against the abutment 19. The trigger 13 is swung into horizontal position to extend across from the jaw 9 toward the jaw 10, the free end of said trigger being placed against the depending trigger 14 near its connection with the cross bar of the jaw 10. The spring action of the jaw 9 holds the trigger 13 pressed endwise against the trigger 14, and the free end of the latter presses sidewise against the abutment 19, whereby the platform 16 is held elevated, and the jaws are held set. If now the platform is depressed by the animal stepping thereon, or otherwise, the abutment 19 is withdrawn from the free end of the trigger 14, so that the latter no longer props up the trigger 13 and said trigger 13 is free to drop down. As there is now nothing to hold the jaws open, they spring and close down over the animal as shown in Fig. 2.

In order to prevent the animal from working loose, a chain 20 is connected at one end to the cross bar of the jaw 9, the other end of the chain being made fast to a suitable anchoring post 21. The cross bar 6 adjacent to the jaw 10 carries a loop or eye 22 through which the chain passes. The chain carries, intermediate its ends, a small pin or other attachment 23 which, when the trap is set, may be placed so that it comes between the trigger 14 and the end of the trigger 13, said pin being thus held between the triggers, whereby the chain is held elevated. The chain may also be held elevated by slipping it over the top cross bar of the jaw 10, which gives it a loose support, and enables it to fall out of the way when the trap is sprung. If the pin 23 is employed for holding the chain elevated, said pin is released when the trap is sprung. In either case the chain is left loose and in position to tighten the jaw 9 down on the animal. The greater the pull back against the chain, the tighter will the jaw 9 press against the animal, and the animal is thus effectually prevented from working loose and effecting escape from the trap. The loop 22 not only acts as a guide for the chain, but also locks the same, a detent 24 being provided, which engages the chain in such a manner that it is held against slipping in a direction to release the jaw 9. This detent is carried by the loop or eye 22.

The trap is not only a bait trap, but it can also be placed across the entrance of a den so that the animal will have to pass through it. Irrespective of the position of the trap, the animal is caught across the body so that there is no danger of injury to the fur.

I claim:

1. An animal trap comprising a base, a pair of opposite spring jaws and a tiltable bait support carried by the base, said bait support having an abutment, and a pivoted trigger carried by each jaw, the trigger of one of the jaws depending therefrom and engaging the aforesaid abutment, and the other trigger extending between the jaws and having its free end engaging the first-mentioned trigger when the trap is set.

2. An animal trap comprising a base, a pair of opposite spring jaws and a tiltable bait support carried by the base, said bait support having an abutment, and a pivoted trigger carried by each jaw, the trigger of one of the jaws depending therefrom and engaging the aforesaid abutment, and the other trigger extending between the jaws and having its free end engaging the first-mentioned trigger when the trap is set, each jaw being composed of spaced side bars having a spring connection at one end with the base, and the other end of said side bars having a cross bar connecting the same, the triggers being carried by the cross bars of the respective jaws.

3. An animal trap comprising a base, a pair of opposite spring jaws and a tiltable bait support carried by the base, said bait support having an abutment, and a pivoted trigger carried by each jaw, the trigger of one of the jaws depending therefrom and engaging the aforesaid abutment, and the other trigger extending between the jaws and having its free end engaging the first-mentioned trigger when the trap is set, each jaw being composed of spaced side bars having a spring connection at one end with the base, and the other end of said side bars having a cross bar connecting the same, the spread and length of the side bars of one jaw being greater than that of the other jaw to permit the jaws to pass each other when swung down toward the base.

4. An animal trap comprising a base, a pair of opposite spring jaws and a tiltable bait support carried by the base, said bait support having an abutment, and a pivoted trigger carried by each jaw, the trigger of one of the jaws depending therefrom and engaging the aforesaid abutment, and the other trigger extending between the jaws and having its free end engaging the first-mentioned trigger when the trap is set, each jaw being composed of spaced side bars having a spring connection at one end with the base, and the other end of said side bars having a cross bar connecting the same, the spread and length of the side bars of one jaw being greater than that of the other jaw to permit the jaws to pass each other when swung down toward the base, the cross bar of the first-mentioned jaw being offset from its side bars.

5. An animal trap comprising a base having spaced side bars, spring jaws carried by the base, a tiltable bait support pivoted to one of the side bars of the base and extending across to the other side bar, said bait support having an abutment, and a pivoted trigger carried by each jaw, the trigger of one of the jaws depending therefrom and engaging the aforesaid abutment, and the other trigger extending between the jaws and having its free end engaging the first-mentioned trigger when the trap is set, the aforesaid jaws being located on opposite sides of the bait support, and each jaw being composed of spaced side bars having a spring connection at one end with the base, and the other end of said side bars having a cross bar connecting the same, the spread and length of the side bars of one jaw being greater than that of the other jaw to permit the jaws to pass each other when swung down toward the base.

6. An animal trap comprising a base, a pair of opposite spring jaws and a tiltable bait support carried by the base, said bait support having an abutment, a pivoted trigger carried by each jaw, the trigger of one of the jaws depending therefrom and engaging the aforesaid abutment, and the other trigger extending between the jaws and having its free end engaging the first-mentioned trigger when the trap is set, a chain connected to one of the jaws, an anchoring device for the chain, and a guide on the base through which the chain passes.

7. An animal trap comprising a base, a pair of opposite spring jaws and a tiltable bait support carried by the base, said bait support having an abutment, a pivoted trigger carried by each jaw, the trigger of one of the jaws depending therefrom and engaging the aforesaid abutment, and the other trigger extending between the jaws and having its free end engaging the first-mentioned trigger when the trap is set, a chain connected to one of the jaws, an anchoring device for the chain, and a guide on the base through which the chain passes, said chain having a suspension member which is held by the triggers when the trap is set.

8. An animal trap comprising a base, a pair of opposite spring jaws and a tiltable bait support carried by the base, said bait support having an abutment, a pivoted trigger carried by each jaw, the trigger of one of the jaws depending therefrom and engaging the aforesaid abutment, and the other trigger extending between the jaws and having its free end engaging the first-mentioned trigger when the trap is set, a chain connected to one of the jaws and held suspended above the bait support when the trap is set, an anchoring device for the chain, a guide on the base through which the chain passes, and means on said guide for preventing the chain from slipping back.

In testimony whereof I affix my signature in presence of two witnesses.

THOMAS J. ELLISON.

Witnesses:
S. P. DEATHRIDGE,
J. W. CROOKE.

Copies of this patent may be obtained for five cents each, by addressing the "Commissioner of Patents, Washington, D. C."